US008680386B2

(12) United States Patent
Shibuya et al.

(10) Patent No.: US 8,680,386 B2
(45) Date of Patent: Mar. 25, 2014

(54) SIGNAL PROCESSING DEVICE, SIGNAL PROCESSING METHOD, AND PROGRAM

(75) Inventors: Takashi Shibuya, Tokyo (JP); Keisuke Toyama, Tokyo (JP); Mototsugu Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 238 days.

(21) Appl. No.: 13/277,971

(22) Filed: Oct. 20, 2011

(65) Prior Publication Data

US 2012/0103166 A1 May 3, 2012

(30) Foreign Application Priority Data

Oct. 29, 2010 (JP) ................................ P2010-243912

(51) Int. Cl.
*G10H 7/00* (2006.01)

(52) U.S. Cl.
USPC .............................................. 84/609; 84/649

(58) Field of Classification Search
USPC .................................... 84/600–602, 609, 649
See application file for complete search history.

(56) References Cited

U.S. PATENT DOCUMENTS

| 5,510,572 | A  | * | 4/1996  | Hayashi et al. ................. 84/609 |
| 5,874,686 | A  | * | 2/1999  | Ghias et al. ..................... 84/609 |
| 6,437,227 | B1 | * | 8/2002  | Theimer .......................... 84/609 |
| 6,476,306 | B2 | * | 11/2002 | Huopaniemi et al. ........... 84/609 |
| 6,504,089 | B1 | * | 1/2003  | Negishi et al. .................. 84/609 |
| 6,967,275 | B2 | * | 11/2005 | Ozick ............................. 84/616 |
| 6,995,309 | B2 | * | 2/2006  | Samadani et al. .............. 84/603 |
| 7,064,262 | B2 | * | 6/2006  | Klefenz et al. ................. 84/616 |
| 7,488,886 | B2 | * | 2/2009  | Kemp ............................. 84/609 |
| 7,619,155 | B2 | * | 11/2009 | Teo et al. ........................ 84/616 |
| 7,689,638 | B2 | * | 3/2010  | Theimer et al. ............... 708/422 |
| 8,049,093 | B2 | * | 11/2011 | Jeon et al. ....................... 84/609 |
| 8,497,417 | B2 | * | 7/2013  | Lyon et al. ...................... 84/609 |
| 2002/0038597 | A1 | * | 4/2002 | Huopaniemi et al. .......... 84/609 |
| 2006/0075881 | A1 | * | 4/2006 | Streitenberger et al. ........ 84/609 |
| 2011/0173208 | A1 | * | 7/2011 | Vogel ............................ 707/746 |
| 2012/0103166 | A1 | * | 5/2012 | Shibuya et al. ................ 84/616 |
| 2012/0160078 | A1 | * | 6/2012 | Lyon et al. ..................... 84/609 |
| 2012/0192701 | A1 | * | 8/2012 | Watanabe et al. .............. 84/622 |
| 2013/0044885 | A1 | * | 2/2013 | Master et al. ................... 381/56 |
| 2013/0192445 | A1 | * | 8/2013 | Sumi et al. ..................... 84/609 |

FOREIGN PATENT DOCUMENTS

| JP | 2004-326050 | 11/2004 |
| JP | 2009-276776 | 11/2009 |

* cited by examiner

*Primary Examiner* — David S. Warren
(74) *Attorney, Agent, or Firm* — Sony Corporation

(57) ABSTRACT

A signal processing device that identifies a piece of music of an input signal by comparing the input signal with a plurality of reference signals including only a piece of music includes a weight distribution generating section that generates a weight distribution corresponding to a likeness to music in regions of the input signal transformed into a time-frequency domain, and a similarity calculating section that calculates degrees of similarity between a feature quantity in the regions of the input signal transformed into the time-frequency domain and feature quantities in the regions of the reference signals transformed into the time-frequency domain on the basis of the weighting based on the weight distribution.

8 Claims, 13 Drawing Sheets

FIG. 12
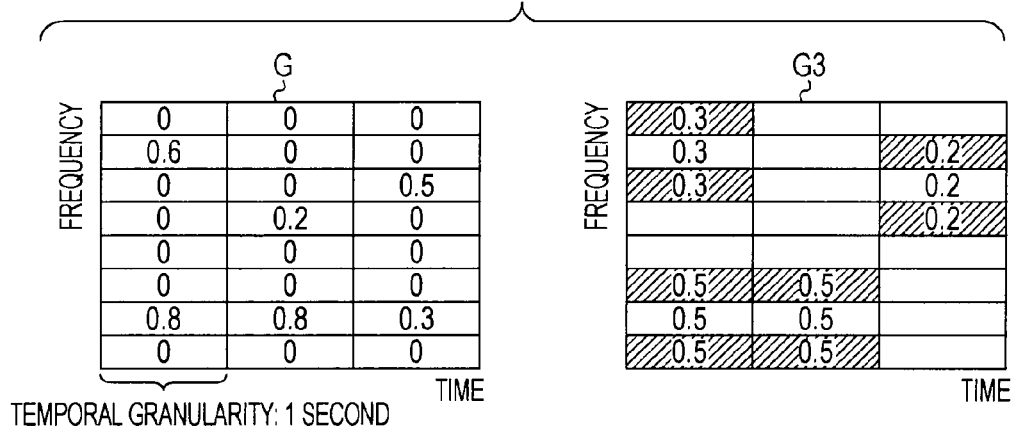
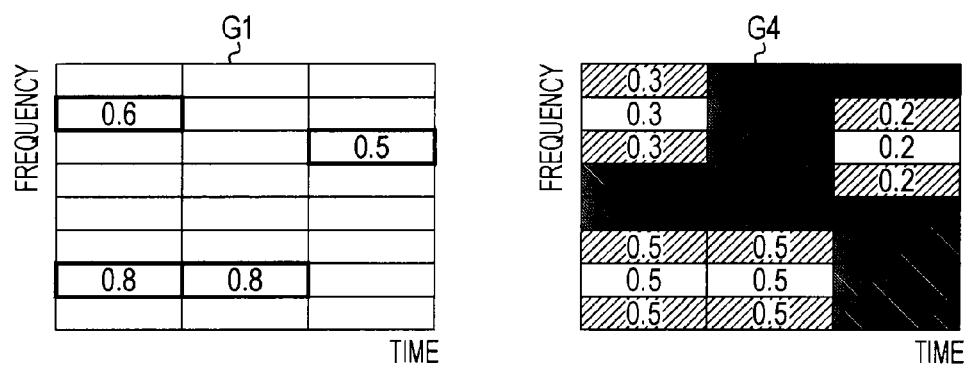
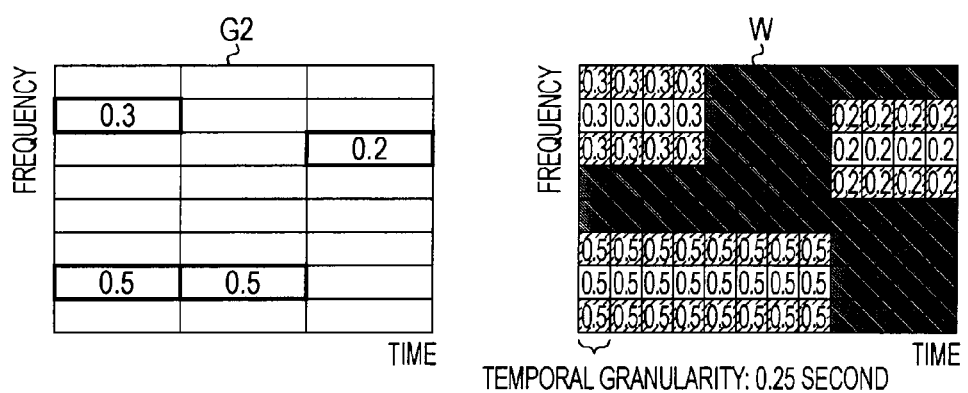

SIGNAL PROCESSING DEVICE, SIGNAL PROCESSING METHOD, AND PROGRAM

BACKGROUND

The present disclosure relates to a signal processing device, a signal processing method, and a program, and more particularly, a signal processing device, a signal processing method, and a program which can identify a piece of music from an input signal in which the piece of music and noise are mixed.

In the related art, in order to identify a piece of music input as an input signal, a matching process of matching the feature quantity of the input signal with the feature quantity of reference signals which are candidates for the piece of music to be identified is performed. However, for example, when a broadcast sound source of a television program such as a drama is input as an input signal, the input signal often includes a signal component of a piece of music as background music (BGM) and noise components (hereinafter, also referred to as noise) other than the piece of music, such as a human conversation or noise (ambient noise) and a variation in feature quantity of the input signal due to the noise affects the result of the matching process.

Therefore, a technique of performing a matching process using only components with a high reliability by the use of a mask pattern masking components with a low reliability in the feature quantity of an input signal has been proposed.

Specifically, a technique of preparing plural types of mask patterns masking matrix components corresponding to a predetermined time-frequency domain for a feature matrix expressing the feature quantity of an input signal transformed into a signal in the time-frequency domain and performing a matching process of matching the feature quantity of the input signal with the feature quantities of plural reference signals in a database using all the mask patterns to identify the piece of music of the reference signal having the highest degree of similarity as a piece of music of the input signal has been proposed (for example, see Japanese Unexamined Patent Application Publication No. 2009-276776).

A technique of assuming that a component of a time interval with high average power in an input signal is a component on which noise other than a piece of music is superimposed and creating a mask pattern allowing a matching process using only the feature quantity of a time interval with low average power in the input signal has also been proposed (for example, see Japanese Unexamined Patent Application Publication No. 2004-326050).

SUMMARY

However, since it is difficult to predict the time interval at which noise is superimposed and the frequency at which noise is superimposed in an input signal and it is also difficult to prepare a mask pattern suitable for such an input signal in advance, the technique disclosed in Japanese Unexamined Patent Application Publication No. 2009-276776 does not perform an appropriate matching process and may not identify with high precision a piece of music from the input signal in which the piece of music and noise are mixed.

In the technique disclosed in Japanese Unexamined Patent Application Publication No. 2004-326050, a mask pattern corresponding to an input signal can be created, but it is difficult to say that the mask pattern is a mask pattern suitable for the input signal, because frequency components are not considered. As shown on the left side of FIG. 1, when noise Dv based on a human conversation is included in a signal component Dm of a piece of music in an input signal in the time-frequency domain, the technique disclosed in Japanese Unexamined Patent Application Publication No. 2004-326050 can perform a matching process using only the feature quantities of several time intervals in regions S1 and S2 in which the human conversation is interrupted and it is thus difficult to identify the piece of music from the input signal in which the piece of music and the noise are mixed with high precision. In order to identify a piece of music from an input signal in which the piece of music and noise are mixed with high precision, it is preferable that a matching process should be performed using the feature quantities of the signal components Dm of the piece of music in the regions S3 and S4, as shown in on the right side of FIG. 1.

It is desirable to identify a piece of music from an input signal with high precision.

According to an embodiment of the present disclosure, there is provided a signal processing device that identifies a piece of music of an input signal by comparing the input signal with a plurality of reference signals including only a piece of music, the signal processing device including: a weight distribution generating section that generates a weight distribution corresponding to a likeness to music in regions of the input signal transformed into a time-frequency domain; and a similarity calculating section that calculates degrees of similarity between a feature quantity in the regions of the input signal transformed into the time-frequency domain and feature quantities in the regions of the reference signals transformed into the time-frequency domain on the basis of the weighting based on the weight distribution.

The weight distribution generating section may generate the weight distribution masking the regions in which a music level indicating the likeness to music is not greater than a predetermined threshold value by weighting the regions in which the music level is greater than the predetermined threshold value on the basis of the music level.

The signal processing device may further include: a detection section that detects a point at which a power spectrum of a signal component is the maximum from the input signal; and a music level calculating section that calculates the music level on the basis of the occurrence of the maximum point in a predetermined time interval.

The occurrence may be an occurrence of the maximum point for each frequency.

The similarity calculating section may calculate the degrees of similarity between the feature quantity of the input signal and the feature quantities of the plurality of reference signals. In this case, the signal processing device may further include a determination section that determines that the piece of music of the reference signal from which the highest degree of similarity higher than a predetermined threshold value is calculated among the degrees of similarity is the piece of music of the input signal.

The similarity calculating section may calculate the degrees of similarity between the feature quantity of the input signal and the feature quantities of the plurality of reference signals. In this case, the signal processing device may further include a determination section that determines that the pieces of music of the reference signals from which the degrees of similarity higher than a predetermined threshold value are calculated among the degrees of similarity are the piece of music of the input signal.

The similarity calculating section may calculate the degree of similarity between the feature quantity in the regions of the input signal being transformed into the time-frequency domain and corresponding to a predetermined time and the feature quantities in the regions of the reference signals being transformed into the time-frequency domain and corresponding to the predetermined time on the basis of the weighting based on the weight distribution.

According to another embodiment of the present disclosure, there is provided a signal processing method of identifying a piece of music of an input signal by comparing the input signal with a plurality of reference signals including only a piece of music, the signal processing method including: generating a weight distribution corresponding to a likeness to music in regions of the input signal transformed into a time-frequency domain; and calculating degrees of similarity between a feature quantity in the regions of the input signal transformed into the time-frequency domain and feature quantities in the regions of the reference signals transformed into the time-frequency domain on the basis of the weighting based on the weight distribution.

According to still another embodiment of the present disclosure, there is provided a program causing a computer to perform a signal processing process of identifying a piece of music of an input signal by comparing the input signal with a plurality of reference signals including only a piece of music, the signal processing process including: generating a weight distribution corresponding to a likeness to music in regions of the input signal transformed into a time-frequency domain; and calculating degrees of similarity between a feature quantity in the regions of the input signal transformed into the time-frequency domain and feature quantities in the regions of the reference signals transformed into the time-frequency domain on the basis of the weighting based on the weight distribution.

According to the embodiments of the present disclosure, the weight distribution corresponding to a likeness to music in regions of the input signal transformed into a time-frequency domain is generated and the degree of similarities between a feature quantity in the regions of the input signal transformed into the time-frequency domain and feature quantities in the regions of the reference signals transformed into the time-frequency domain is calculated on the basis of the weighting based on the weight distribution.

According to the embodiments of the present disclosure, it is possible to identify a piece of music from an input signal with high precision.

BRIEF DESCRIPTION OF THE DRAWINGS

FIG. 12 is a diagram illustrating the generation of a mask pattern.

DETAILED DESCRIPTION OF EMBODIMENTS

Hereinafter, embodiments of the present disclosure will be described in detail with reference to the accompanying drawings.

Configuration of Signal Processing Device

Figure 2:
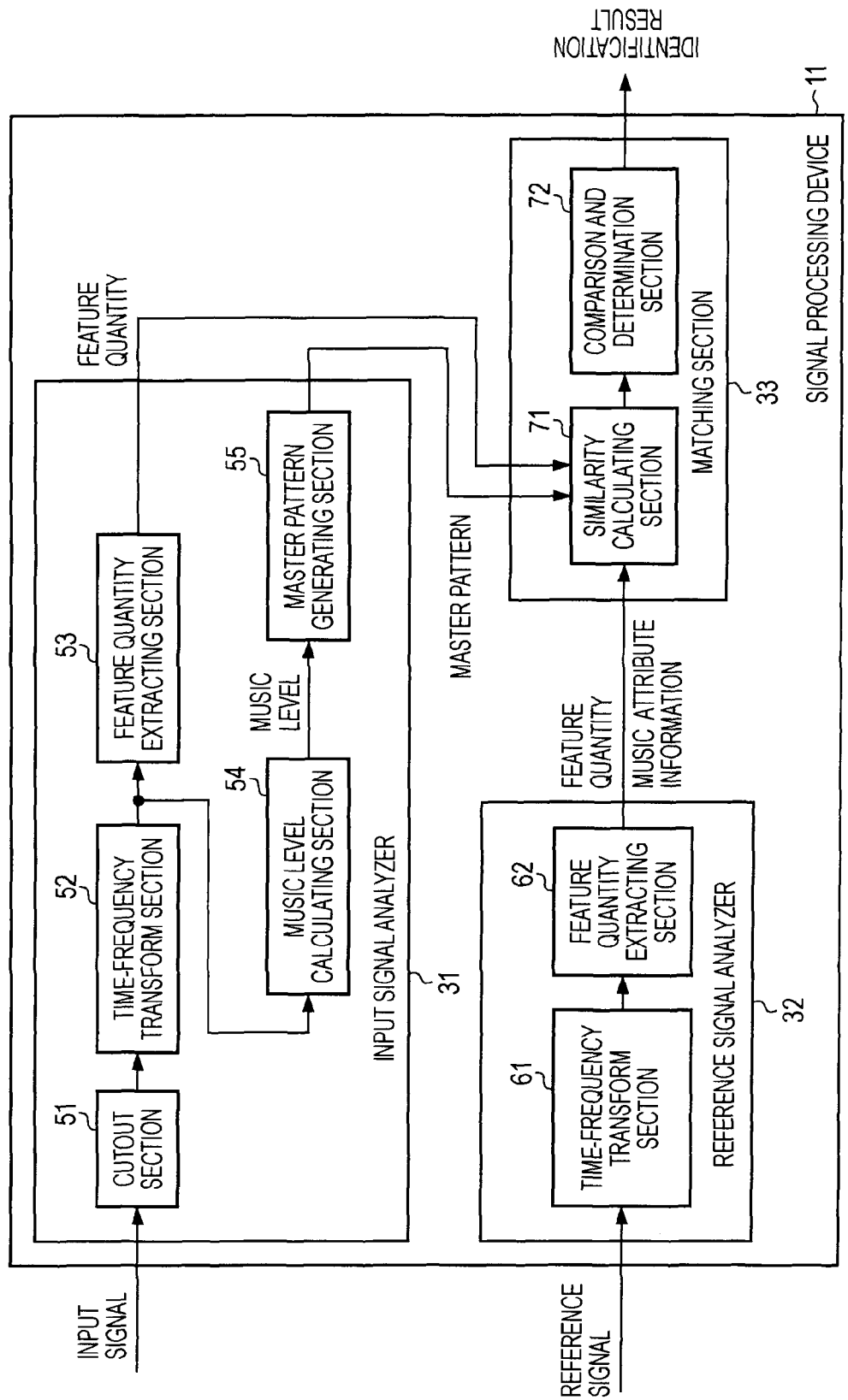
FIG. 2 is a block diagram illustrating the configuration of a signal processing device according to an embodiment of the present disclosure.

FIG. 2 is a diagram illustrating the configuration of a signal processing device according to an embodiment of the present disclosure.

The signal processing device 11 shown in FIG. 2 identifies a piece of music of an input signal and outputs the identification result, by comparing an input signal including a signal component of a piece of music and a noise component (noise) such as a human conversation and noise with reference signals not including noise but including a piece of music.

The signal processing device 11 includes an input signal analyzer 31, a reference signal analyzer 32, and a matching section 33.

The input signal analyzer 31 analyzes an input signal input from an external device or the like, extracts a feature quantity indicating the feature of the input signal from the input signal, generates a mask pattern used for the comparison of the input signal with reference signals, and supplies the extracted feature quantity and the mask pattern to the matching section 33. The details of the generation of the mask pattern will be described later with reference to FIG. 12 and the like.

The input signal analyzer 31 includes a cutout section 51, a time-frequency transform section 52, a feature quantity extracting section 53, a music level calculating section 54, and a mask pattern generating section 55.

The cutout section 51 cuts out a signal segment corresponding to a predetermined time from the input signal to the time-frequency transform section 52 and supplies the signal segment to the time-frequency transform section 52.

The time-frequency transform section 52 transforms the signal segment of the predetermined time from the cutout section 51 into a signal (spectrogram) in the time-frequency domain and supplies the transformed signal to the feature quantity extracting section 53 and the music level calculating section 54.

The feature quantity extracting section 53 extracts the feature quantity indicating the feature of the input signal for each time-frequency region of the spectrogram from the spectrogram of the input signal from the time-frequency transform section 52 and supplies the extracted feature quantities to the matching section 33.

The music level calculating section 54 calculates a music level, which is an indicator of a likeness to music of the input signal, for each time-frequency region of the spectrogram on the basis of the spectrogram of the input signal from the time-frequency transform section 52 and supplies the calculated music level to the mask pattern generating section 55.

The mask pattern generating section 55 generates a mask pattern used for a matching process of matching the feature quantity of the input signal with the feature quantities of the reference signals on the basis of the music level of each time-frequency region of the spectrogram from the music level calculating section 54 and supplies the mask pattern to the matching section 33.

The reference signal analyzer 32 analyzes plural reference signals stored in a storage unit not shown or input from an external device, extracts the feature quantities indicating a feature of the respective reference signals from the reference signals, and supplies the extracted feature quantities to the matching section 33.

The reference signal analyzer 32 includes a time-frequency transform section 61 and a feature quantity extracting section 62.

The time-frequency transform section 61 transforms the reference signals into spectrograms and supplies the spectrograms to the feature quantity extracting section 62.

The feature quantity extracting section 62 extracts the feature quantities indicating the features of the reference signals for each time-frequency region of the spectrograms from the spectrograms of the reference signals from the time-frequency transform section 61 and supplies the extracted feature quantities to the matching section 33.

The matching section 33 identifies the piece of music included in the input signal by performing a matching process of matching the feature quantity of the input signal from the input signal analyzer 31 with the feature quantities of the reference signals from the reference signal analyzer 32 using the mask pattern from the input signal analyzer 31.

The matching section 33 includes a similarity calculating section 71 and a comparison and determination section 72.

The similarity calculating section 71 calculates degrees of similarity between the feature quantity of the input signal from the input signal analyzer 31 and the feature quantities of the plural reference signals from the reference signal analyzer 32 using the mask pattern from the input signal analyzer 31 and supplies the calculated degrees of similarity to the comparison and determination section 72.

The comparison and determination section 72 determines that the piece of music of the reference signal from which the highest degree of similarity higher than a predetermined threshold value is calculated among the degrees of similarity from the similarity calculating section 71 is the piece of music of the input signal and outputs music piece information indicating the attribute of the piece of music of the reference signal as the identification result.

Configuration of Music Level Calculating Section

The detailed configuration of the music level calculating section 54 shown in FIG. 2 will be described below with reference to FIG. 3.

Figure 3:
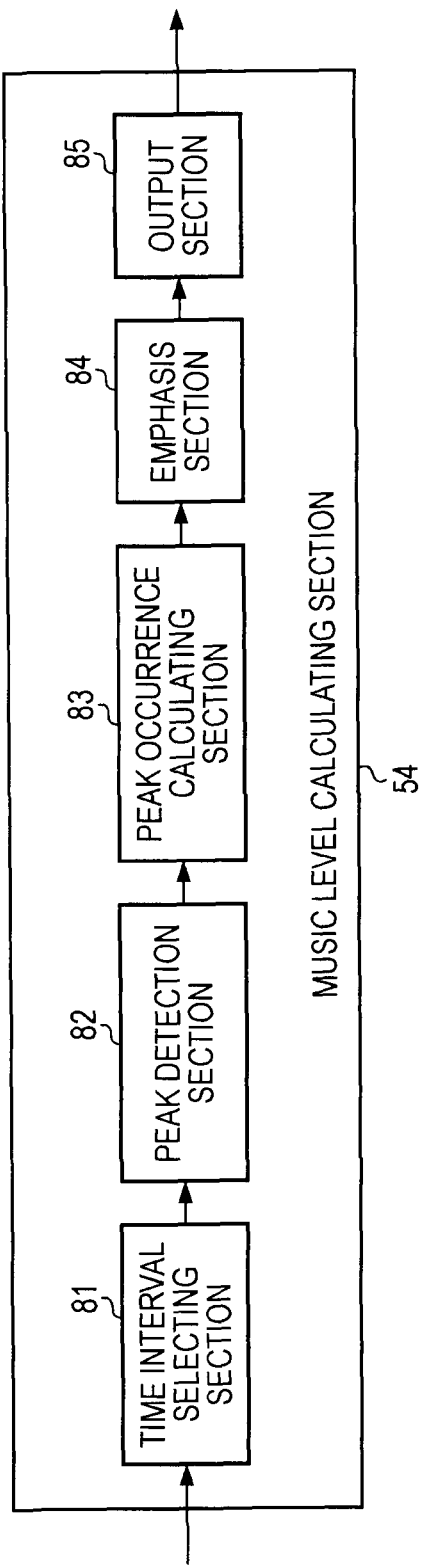
FIG. 3 is a block diagram illustrating the functional configuration of a music level calculating section.

The music level calculating section 54 shown in FIG. 3 includes a time interval selecting section 81, a peak detecting section 82, a peak occurrence calculating section 83, an emphasis section 84, and an output section 85.

The time interval selecting section 81 selects a spectrogram of a predetermined time interval in the spectrogram of the input signal from the time-frequency transform section 52 and supplies the selected spectrogram to the peak detecting section 82.

The peak detecting section 82 detects a peak, at which is the intensity of a signal component is the maximum, for each time frame in the spectrogram of the predetermined time interval selected by the time interval selecting section 81.

The peak occurrence calculating section 83 calculates the occurrence of the peak detected by the peak detecting section 82 in the spectrogram of the predetermined time interval for each frequency.

The emphasis section 84 performs an emphasis process of emphasizing the value of the occurrence calculated by the peak occurrence calculating section 83 and supplies the resultant to the output section 85.

The output section 85 stores the peak occurrence for the spectrogram of the predetermined time interval on which the emphasis process is performed by the emphasis section 84. The output section 85 supplies (outputs) the peak occurrence for the spectrograms of the overall time intervals as a music level, which is an indicator of a likeness to music of the input signal, to the mask pattern generating section 55.

In this way, the music level having a value (element) for each unit frequency is calculated for each predetermined time interval in the time-frequency regions.

Configuration of Mask Pattern Generating Section

The detailed configuration of the mask pattern generating section 55 shown in FIG. 2 will be described below with reference to FIG. 4.

Figure 4:
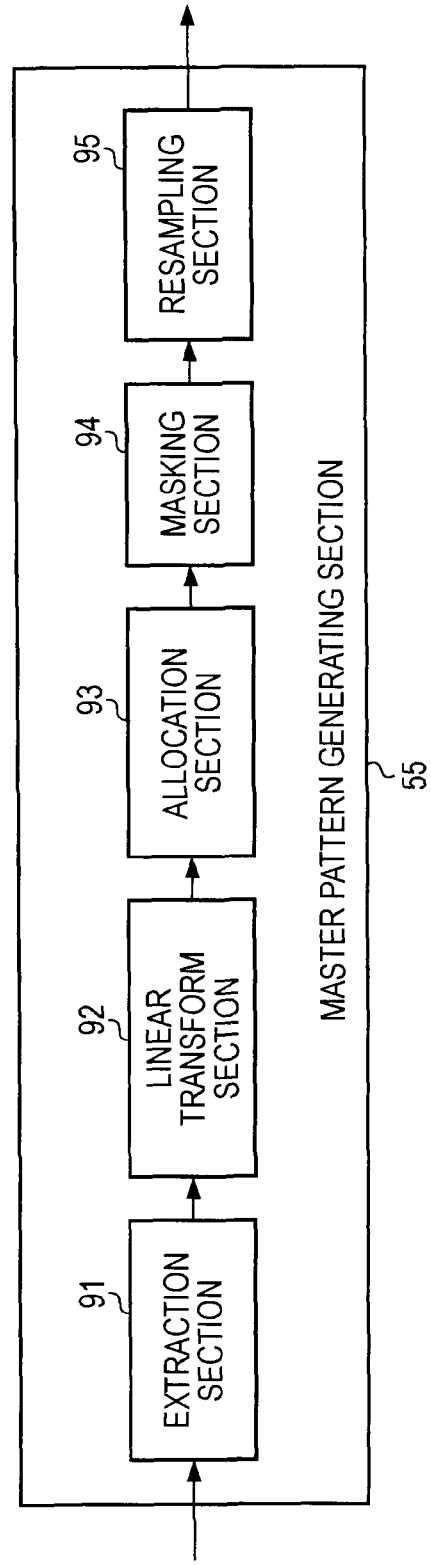
FIG. 4 is a block diagram illustrating the functional configuration of a mask pattern generating section.

The mask pattern generating section 55 shown in FIG. 4 includes an extraction section 91, a linear transform section 92, an allocation section 93, a masking section 94, and a re-sampling section 95.

The extraction section 91 extracts elements of which the value is greater than a predetermined threshold value out of the elements of the music level from the music level calculating section 54 and supplies the extracted elements to the linear transform section 92.

The linear transform section 92 performs a predetermined linear transform process on the values of the elements extracted by the extraction section 91 and supplies the resultant to the allocation section 93.

The allocation section 93 allocates the values acquired through the predetermined linear transform process of the linear transform section 92 to the peripheral elements of the elements, which are extracted by the extraction section 91, in the music level of the time-frequency domain.

The masking section 94 masks the regions (elements), which are not extracted by the extraction section 91 and to which the linearly-transformed values are not allocated by the allocation section 93, in the music level of the time-frequency domain.

The re-sampling section 95 performs a re-sampling process in the time direction on the music level of the time-frequency domain of which the above-mentioned regions are masked so as to correspond to the temporal granularity (the magnitude of a time interval for each element) of the feature quantity of the input signal extracted by the feature quantity extracting section 53. The re-sampling section 95 supplies the music level acquired as the result of the re-sampling process as a mask pattern used for the matching process of matching the feature quantity of the input signal with the feature quantities of the reference signals to the matching section 33.

Music Piece Identifying Process of Signal Processing Device

The music piece identifying process in the signal processing device 11 will be described below with reference to the flowchart shown in FIG. 5. The music piece identifying process is started when an input signal including a piece of music to be identified is input to the signal processing device 11 from an external device or the like. The input signal is input to the signal processing device 11 continuously over time.

In step S11, the input signal analyzer 31 performs an input signal analyzing process to analyze the input signal input from the external device or the like, to extract the feature quantity of the input signal from the input signal, and to generate a mask pattern used for the comparison of the input signal with reference signals.

Input Signal Analyzing Process

Here, the details of the input signal analyzing process in step S11 of the flowchart shown in FIG. 5 will be described with reference to the flowchart shown in FIG. 6.

In step S31, the cutout section 51 of the input signal analyzer 31 cuts out a signal corresponding to a predetermined time (for example, 15 seconds) from the input signal and supplies the cut-out signal to the time-frequency transform section 52.

In step S32, the time-frequency transform section 52 transforms the input signal of the predetermined time from the cutout section 51 into a spectrogram and supplies the spectrogram to the feature quantity extracting section 53 and the music level calculating section 54. The time-frequency transform section 52 may perform a frequency axis distorting process such as a Mel frequency transform process of compressing frequency components of the spectrogram with a Mel scale.

In step S33, the feature quantity extracting section 53 extracts the feature quantity of each time-frequency region of the spectrogram from the spectrogram of the input signal from the time-frequency transform section 52 and supplies the extracted feature quantities to the matching section 33. More specifically, the feature quantity extracting section 53 calculates average values of power spectrums for each predetermined time interval (for example, 0.25 seconds) in the spectrogram of the input signal, normalizes the average values, and defines an arrangement of the average values in time series as a feature quantity.

Figure 7:
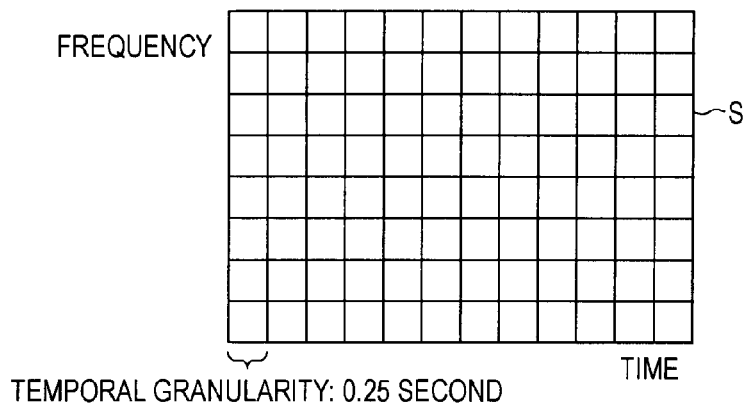
FIG. 7 is a diagram illustrating a feature quantity of an input signal.

FIG. 7 is a diagram illustrating the feature quantity extracted by the feature quantity extracting section 53.

As shown in FIG. 7, the feature quantity S of the input signal extracted from the spectrogram of the input signal includes elements (hereinafter, also referred to as components) in the time direction and the frequency direction. Squares (cells) in the feature quantity S represent elements of each time and each frequency, respectively, and have a value as a feature quantity although not shown in the drawing. As shown in FIG. 7, the temporal granularity of the feature quantity S is 0.25 seconds.

In this way, since the feature quantity of the input signal extracted from the spectrogram of the input signal has elements of each time and each frequency, it can be treated as a matrix.

The feature quantity is not limited to the normalized average power spectrums, but may be a music level to be described later or may be a spectrogram itself obtained by transforming the input signal into a signal in the time-frequency domain.

Referring to the flowchart shown in FIG. 6 again, in step S34, the music level calculating section 54 performs the music level calculating process on the basis of the spectrogram of the input signal from the time-frequency transform section 52 to calculate the music level, which is an indicator of a likeness to music of the input signal, for each time-frequency region of the spectrogram of the input signal.

The stability of tone in the input signal is used for the calculation of the music level in the music level calculating process. Here, a tone is defined as representing the intensity (power spectrum) of a signal component of each frequency. In general, since a sound having a specific musical pitch (frequency) lasts for a predetermined time in a piece of music, the tone in the time direction is stabilized. On the other hand, a tone in the time direction is unstable in a human conversation and a tone lasting in the time direction is rare in ambient noise. Therefore, in the music level calculating process, the music level is calculated by numerically converting the presence and stability of a tone in an input signal of a predetermined time interval.

Music Level Calculating Process

Figure 8:
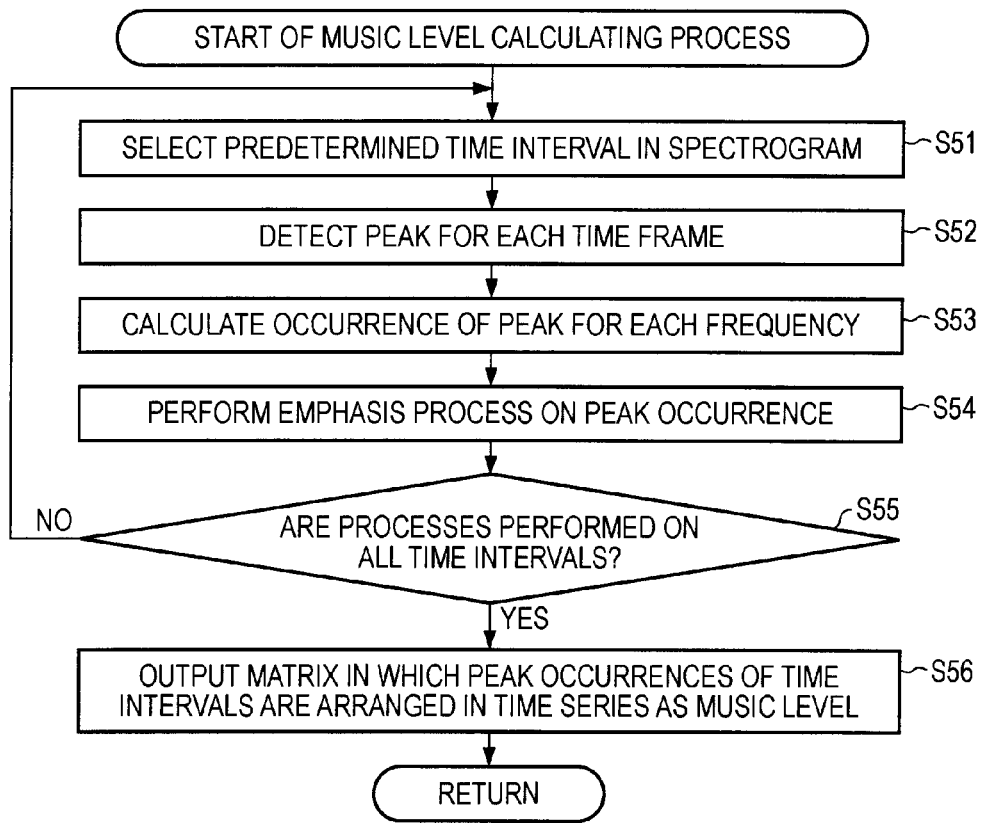
FIG. 8 is a flowchart illustrating a music level calculating process.

The details of the music level calculating process in step S34 of the flowchart shown in FIG. 6 will be described below with reference to the flowchart shown in FIG. 8.

In step S51, the time interval selecting section 81 of the music level calculating section 54 selects a spectrogram of a predetermined time interval (for example, the first 1 second out of the input signal of 15 seconds) in the spectrogram of the input signal from the time-frequency transform section 52 and supplies the selected spectrogram to the peak detecting section 82.

In step S52, the peak detecting section 82 detects a peak which is a point in the time-frequency region at which the power spectrum (intensity) of a signal component of each frequency band is the maximum in the vicinity of the frequency band for each time frame (time bin) in the spectrogram of 1 second selected by the time interval selecting section 81.

Figure 9:
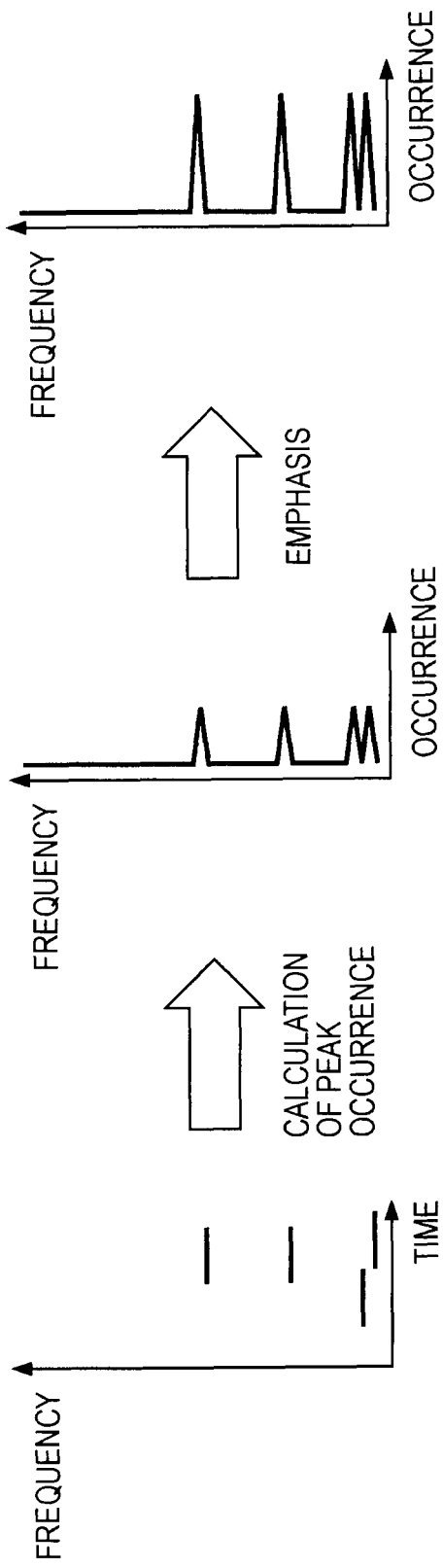
FIG. 9 is a diagram illustrating the calculation of a music level.

For example, in the spectrogram of a piece of music corresponding to one second, since a sound having a specific frequency lasts for a predetermined time, the peak of the signal component appears in the specific frequency band, as shown on the left side of FIG. 9.

Figure 10:
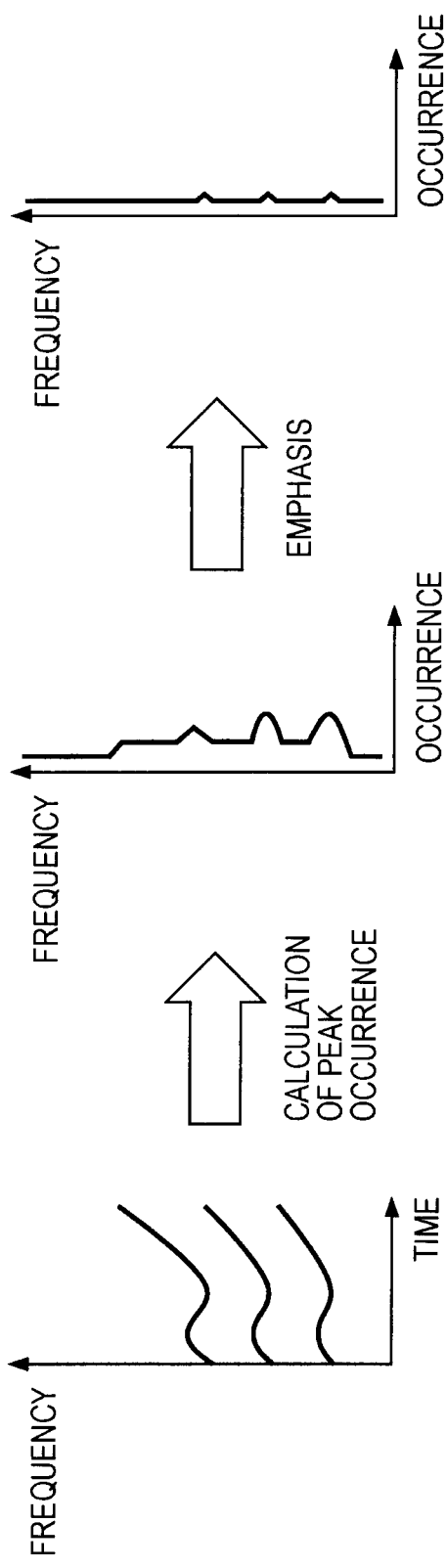
FIG. 10 is a diagram illustrating the calculation of a music level.

On the other hand, for example, in a spectrogram of a human conversation corresponding to one second, since the tone thereof is unstable, the peak of the signal component appears in various frequency bands, as shown on the left side of FIG. 10.

In step S53, the peak occurrence calculating section 83 calculates the appearances (presences) (hereinafter, referred to as peak occurrence) of the peak, which is detected by the peak detecting section 82, for each frequency in the time direction in the spectrogram of one second.

For example, when the peaks shown on the left side of FIG. 9 are detected in the spectrogram of one second, the peaks appear in a constant frequency band in the time direction. Accordingly, the peak occurrence having peaks in constant frequencies is calculated as shown at the center of FIG. 9.

On the other hand, for example, when peaks shown on the left side of FIG. 10 are detected in the spectrogram of one second, the peaks appear over various frequency bands in the time direction. Accordingly, the peak occurrence which is gentle in the time direction is calculated as shown at the center of FIG. 10.

In calculating the peak occurrence, the peak occurrence may be calculated in consideration of a peak lasting for a predetermined time or more, that is, the length of a peak.

The peak occurrence calculated for each frequency in this way can be treated as a one-dimensional vector.

In step S54, the emphasis section 84 performs an emphasis process of emphasizing the peak occurrence calculated by the peak occurrence calculating section 83 and supplies the resultant to the output section 85. Specifically, the emphasis section 84 performs a filtering process, for example, using a filter of $[-\frac{1}{2}, 1, -\frac{1}{2}]$ on the vectors indicating the peak occurrence.

For example, when the filtering process is performed on the peak occurrence having the peaks at constant frequencies shown at the center of FIG. 9, the peak occurrence having the emphasized peaks can be obtained as shown on the right side of FIG. 9.

On the other hand, when the filtering process is performed on the peak occurrence having the peaks which are gentle in the frequency direction shown at the center of FIG. 10, the peak occurrence having the attenuated peaks can be obtained as shown on the right side of FIG. 10.

The emphasis process is not limited to the filtering process, but the value of the peak occurrence may be emphasized by subtracting the average value or a mean value of the values of the peak occurrence in the vicinity thereof from the values of the peak occurrence.

In step S55, the output section 85 stores the peak occurrence of the spectrogram of one second having been subjected to the emphasis process by the emphasis section 84 and determines whether the above-mentioned processes are performed on all the time intervals (for example, 15 seconds).

When it is determined in step S55 that the above-mentioned processes are not performed on all the time intervals, the flow of processes is returned to step S51 and the processes of steps S51 to S54 are repeated on the spectrogram of a next time interval (one second). The processes of steps S51 to S54 may be performed on the spectrogram of the time interval of one second as described above, or may be performed while shifting the time interval of the spectrogram to be processed, for example, by 0.5 seconds and causing a part of the time interval to be processed to overlap with the previously-processed time interval.

On the other hand, when it is determined in step S55 that the above-mentioned processes are performed on all the time intervals, the flow of processes goes to step S56.

In step S56, the output section 85 supplies (outputs) a matrix, which is acquired by arranging the stored peak occurrence (one-dimensional vector) for each time interval (one second) in time series, as a music level to the mask pattern generating section 55 and the flow of processes is returned to step S34.

In this way, the music level calculated from the spectrogram of the input signal can be treated as a matrix having elements for each time and each frequency, similarly to the feature quantity extracted by the feature quantity extracting section 53. Here, the temporal granularity of the feature quantities extracted by the feature quantity extracting section 53 is 0.25 second, but the temporal granularity of the music level is 1 second.

Figure 6:
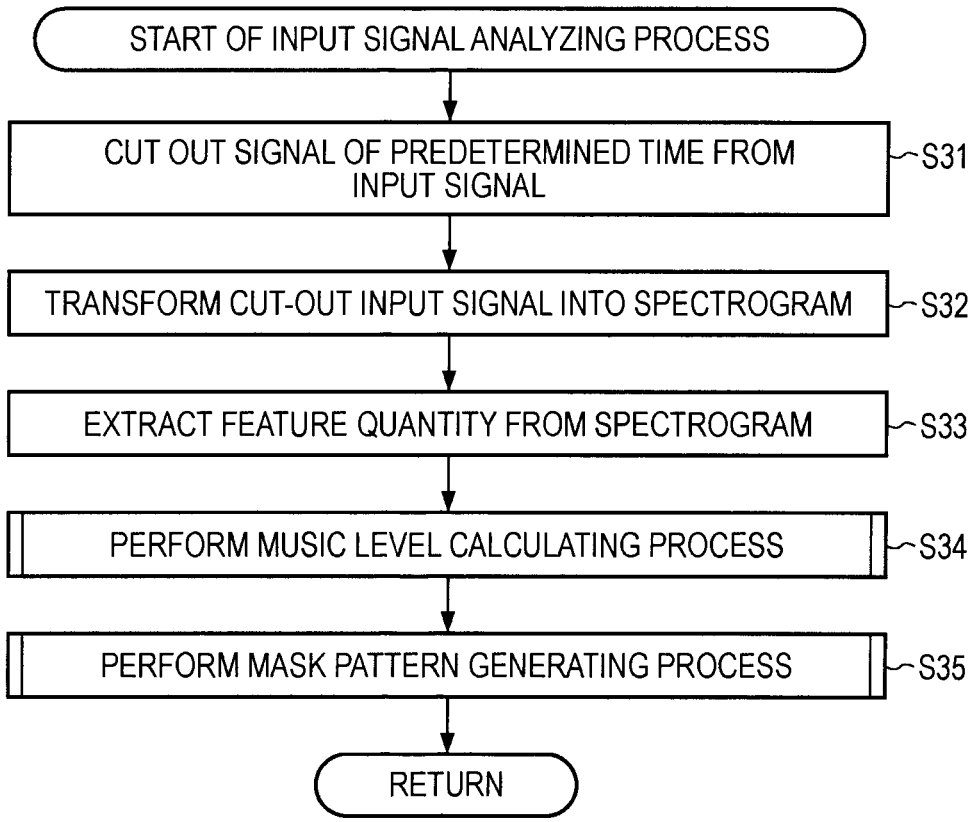
FIG. 6 is a flowchart illustrating an input signal analyzing process.

After the process of step S34 in FIG. 6 is performed, the flow of processes goes to step S35, and the mask pattern generating section 55 performs a mask pattern generating process on the basis of the music level from the music level calculating section 54 and generates a mask pattern used for the matching process of matching the feature quantity of the input signal with the feature quantities of the reference signals.

Mask Pattern Generating Process

Figure 11:
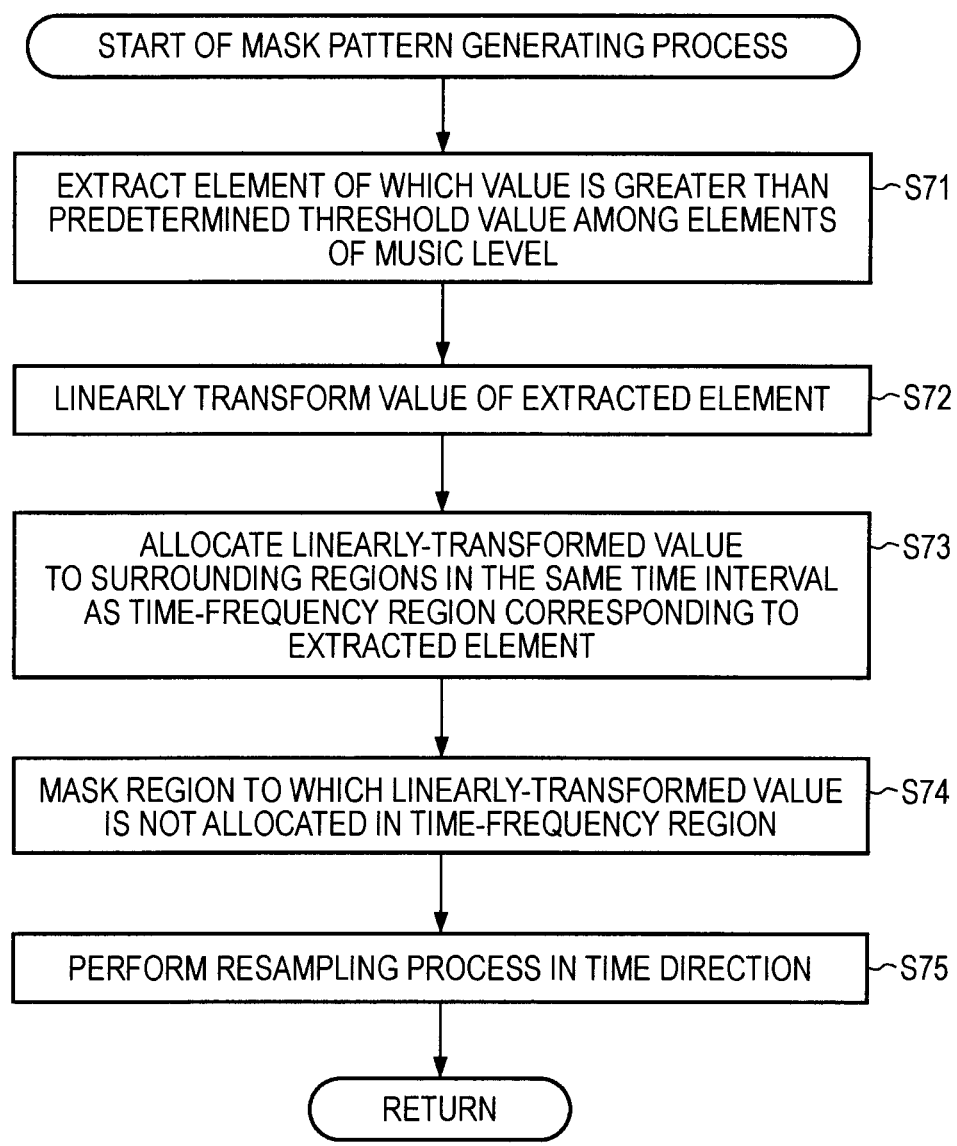
FIG. 11 is a flowchart illustrating a mask pattern generating process.

The details of the mask pattern generating process of step S35 in the flowchart shown in FIG. 6 will be described below with reference to the flowchart shown in FIG. 11.

In step S71, the extraction section 91 of the mask pattern generating section 55 extracts elements of which the value is greater than a predetermined threshold values out of the elements (components) of the music level from the music level calculating section 54 and supplies the extracted elements to the linear transform section 92.

For example, when music level G shown at the upper-left end of FIG. 12 is supplied as the music level from the music level calculating section 54, the extraction section 91 extracts the elements of which the value is greater than 0.3 out of elements of the music level G. Here, in the elements of music level G, when an element in the frequency direction with respect to the lower-left element of music level G is defined by f (where f is in the range of 1 to 8) and an element in the time direction is defined by u (where u is in the range of 1 to 3), the extracted elements $G_{fu}$ are elements $G_{21}$ and $G_{22}$ having a value of 0.8, an element $G_{71}$ having a value of 0.6, and an element $G_{63}$ having a value of 0.5 and music level G1 shown at the left center of FIG. 12 is acquired as a result.

In step S72, the linear transform section 92 performs a predetermined linear transform process on the values of the elements extracted by the extraction section 91 and supplies the resultant to the allocation section 93.

Specifically, when the values of the elements before the linear transform process are defined by x and the values of the elements after the linear transform process are defined by y, the linear transform process is performed on the values of the elements, which are extracted by the extraction section 91, in music level G1 so as to satisfy, for example, $y=x-0.3$, whereby music level G2 shown at the lower-left end of FIG. 12 is obtained.

Although it is stated above that the linear transform process is performed on the values of the elements, the values of the elements may be subjected to a nonlinear transform process using a sigmoid function or the like or may be converted into predetermined binary values by performing a binarizing process.

In step S73, the allocation section 93 allocates the values obtained as the linear transform in the linear transform section 92 to the peripheral regions of the same time intervals as the time-frequency regions corresponding to the elements extracted by the extraction section 91.

Specifically, in music level G2 shown at the lower-left end of FIG. 12, the value of 0.5 is allocated to the elements of the regions adjacent to the same time interval as the region corresponding to the element $G_{21}$ of which the value is transformed into 0.5, that is, the elements $G_{11}$ and $G_{31}$. Similarly, the value of 0.5 is allocated to the elements of the regions adjacent to the same time interval as the region corresponding to the element $G_{22}$ of which the value is transformed into 0.5, that is, the elements $G_{32}$ and $G_{12}$. The value of 0.3 is allocated to the elements of the regions adjacent to the same time interval as the region corresponding to the element $G_{71}$ of which the value is transformed into 0.3, that is, the elements $G_{61}$ and $G_{81}$. The value of 0.2 is allocated to the elements of the regions adjacent to the same time interval as the region corresponding to the element $G_{63}$ of which the value is transformed into 0.2, that is, the elements $G_{53}$ and $G_{73}$.

In this way, music level G3 shown at the upper-right end of FIG. 12 is obtained. In music level G3, the values of the elements in the hatched regions are values allocated by the allocation section 93.

In music level G3 of FIG. 12, the values obtained by the linear transform in the linear transform section 92 are allocated to the elements of the regions adjacent to the same time interval as the time-frequency region corresponding to the elements extracted by the extraction section 91. However, the values may be allocated to the regions further adjacent to the adjacent regions or the regions still further adjacent to the adjacent regions.

In step S74, the masking section 94 masks the regions (elements), which is not extracted by the extraction section 91 and to which the linearly-transformed values are not allocated by the allocation section 93 in the music level of the time-frequency domain, that is, the regions blank in music level G3 shown at the upper-right end of FIG. 12, whereby music level G4 shown at the right center of FIG. 12 is obtained.

In step S75, the re-sampling section 95 performs a re-sampling process in the time direction on the music level of which a specific region is masked so as to correspond to the temporal granularity of the feature quantity of the input signal extracted by the feature quantity extracting section 53.

Specifically, the re-sampling section 95 changes the temporal granularity from 1 second to 0.25 seconds which is the temporal granularity of the feature quantity of the input signal by performing the re-sampling process in the time direction on music level G4 shown at the right center of FIG. 12. The re-sampling section 95 supplies the music level, which is obtained as the re-sampling process result, as a mask pattern W shown at the lower-right end of FIG. 12 to the matching section 33 and the flow of processes is returned to step S35 in the flowchart shown in FIG. 6.

In this way, in the spectrogram of the input signal, a mask pattern as a weight distribution in which a weight based on the music level is given to a region having a high music level which is an indicator of a likeness to music and a region having a low music level is masked is generated. The mask pattern can be treated as a matrix having elements for each time and each frequency, similarly to the feature quantity extracted by the feature quantity extracting section 53, and the temporal granularity is 0.25 seconds which is equal to the temporal granularity of the feature quantity extracted by the feature quantity extracting section 53.

Figure 5:
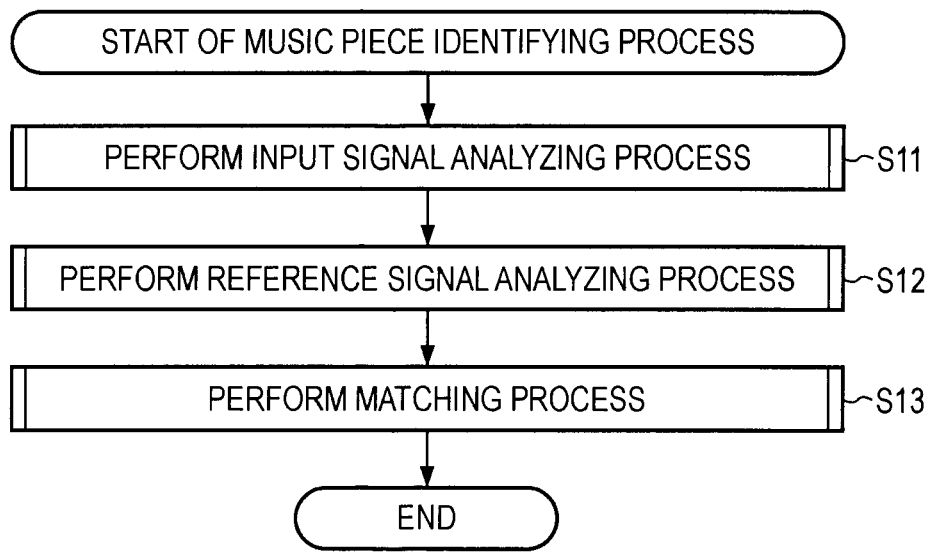
FIG. 5 is a flowchart illustrating a music piece identifying process.

The flow of processes after step S35 in the flowchart shown in FIG. 6 is returned to step S11 in the flowchart shown in FIG. 5.

In the flowchart shown in FIG. 5, the flow of processes after step S11 goes to step S12 and the reference signal analyzer 32 performs a reference signal analyzing process to analyze the reference signals input from the external device or the like and to extract the feature quantities of the reference signals from the reference signals.

Reference Signal Analyzing Process

The details of the reference signal analyzing process of step S12 in the flowchart shown in FIG. 5 will be described below with reference to the flowchart shown in FIG. 13.

In step S91, the time-frequency transform section 61 of the reference signal analyzer 32 transforms the input reference signal into a spectrogram and supplies the resultant spectrogram to the feature quantity extracting section 62.

In step S92, the feature quantity extracting section 62 extracts the feature quantities of the respective time-frequency regions of the spectrogram from the spectrogram of the reference signal from the time-frequency transform section 61 and supplies the extracted feature quantities to the matching section 33, similarly to the feature quantity extracting section 53.

The temporal granularity of the feature quantities of the reference signal extracted in this way is the same as the temporal granularity (for example, 0.25 seconds) of the feature quantities of the input signal. The feature quantity of the input signal corresponds to a signal of a predetermined time (for example, 15 seconds) cut out from the input signal, but the feature quantities of the reference signal correspond to a signal of a piece of music. Accordingly, the feature quantities of the reference signal can be treated as a matrix having elements for each time and each frequency, similarly to the feature quantity of the input signal, but have more elements in the time direction than the elements of the feature quantity of the input signal.

At this time, the feature quantity extracting section 62 reads the music piece information (such as the name of a piece of music, the name of a musician, and a music piece ID) indicating the attributes of the piece of music of each reference signal from a database (not shown) in the signal processing device 11, correlates the read music piece attribute information with the extracted feature quantities of the reference signal, and supplies the correlated results to the matching section 33.

In the reference signal analyzing process, the above-mentioned processes are performed on plural reference signals. The matching section 33 stores the feature quantities and the music piece attribute information of the plural reference signals in a memory area (not shown) in the matching section 33.

The feature quantities and the music piece attribute information of the plural reference signals may be stored in a database (not shown) in the signal processing device 11.

Figure 13:
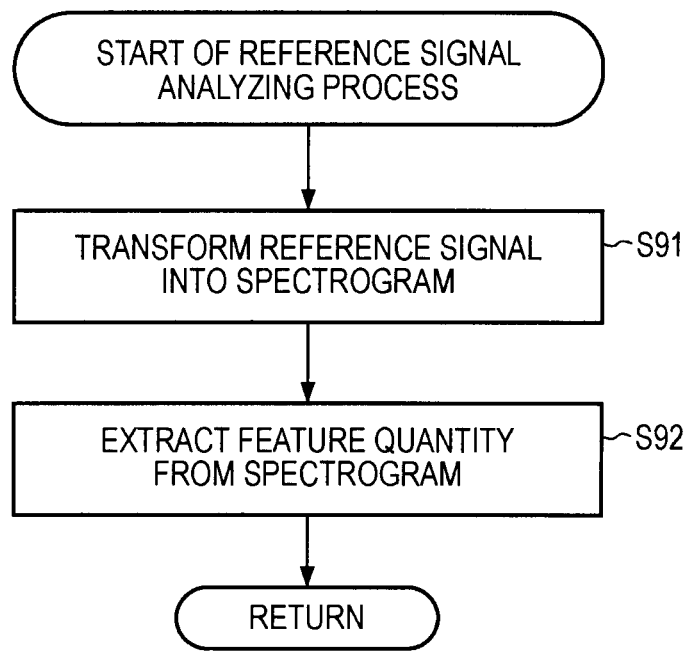
FIG. 13 is a flowchart illustrating a reference signal analyzing process.

The flow of processes after step S92 in the flowchart shown in FIG. 13 is returned to step S12 in the flowchart shown in FIG. 5.

The flow of processes after step S12 in the flowchart shown in FIG. 5 goes to step S13, and the matching section 33 performs a matching process to identify the piece of music included in the input signal and outputs the identification result.

Matching Process

Figure 14:
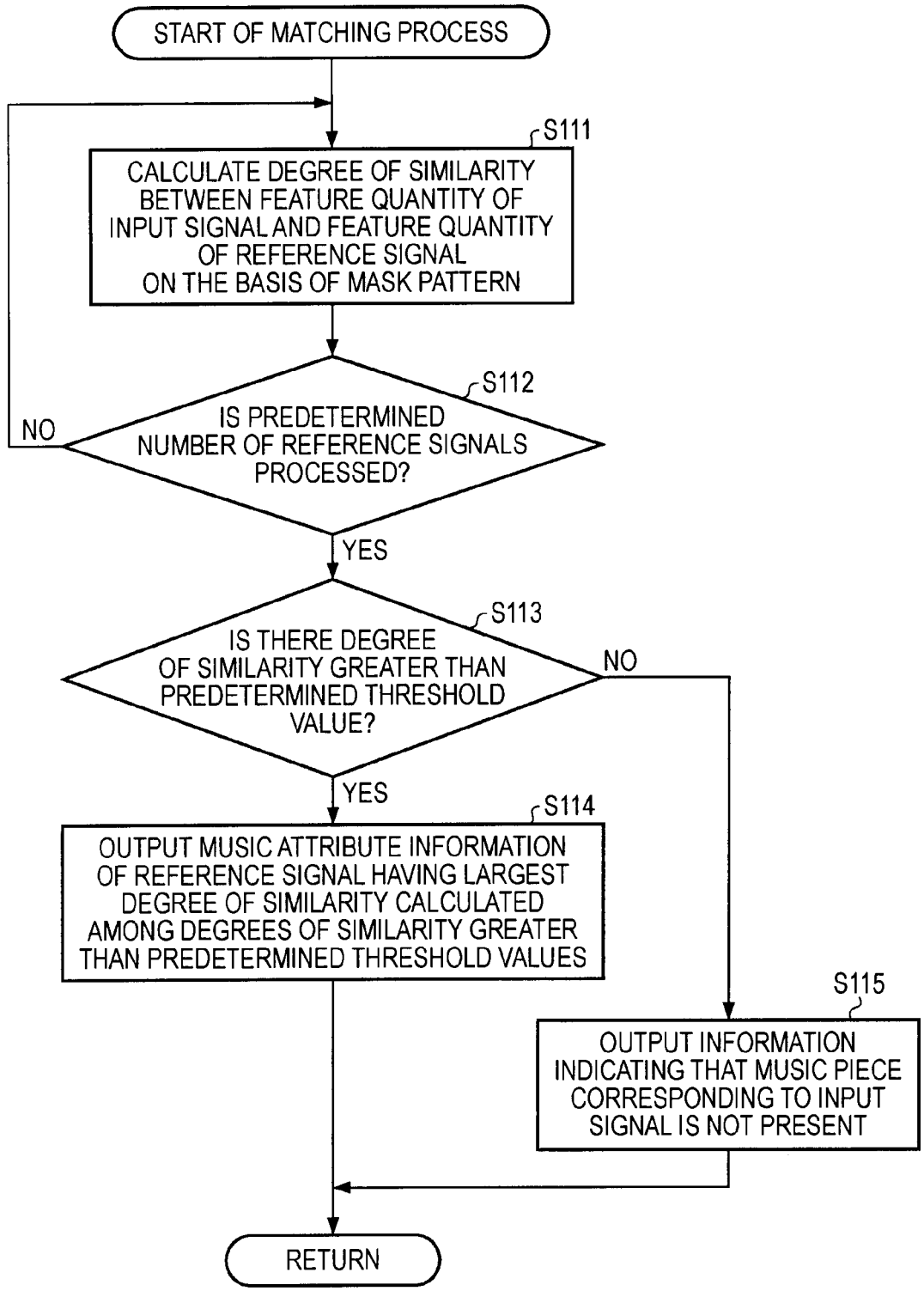
FIG. 14 is a flowchart illustrating a matching process.

The details of the matching process of step S13 in the flowchart shown in FIG. 5 will be described below with reference to the flowchart shown in FIG. 14.

In step S111, the similarity calculating section 71 of the matching section 33 calculates a degree of similarity between the feature quantity of the input signal from the input signal analyzer 31 and the feature quantity of a predetermined reference signal supplied from the reference signal analyzer 32 and stored in a memory area (not shown) in the matching section 33 on the basis of the mask pattern from the input signal analyzer 31, and supplies the calculated degree of similarity to the comparison and determination section 72. When the feature quantity and the music piece attribute information of the reference signal are stored in the database not shown, the feature quantity and the music piece attribute information of the predetermined reference signal are read from the database.

An example of calculating a degree of similarity between the feature quantity of the input signal and the feature quantity of the reference signal will be described below with reference to FIG. 15.

Figure 15:
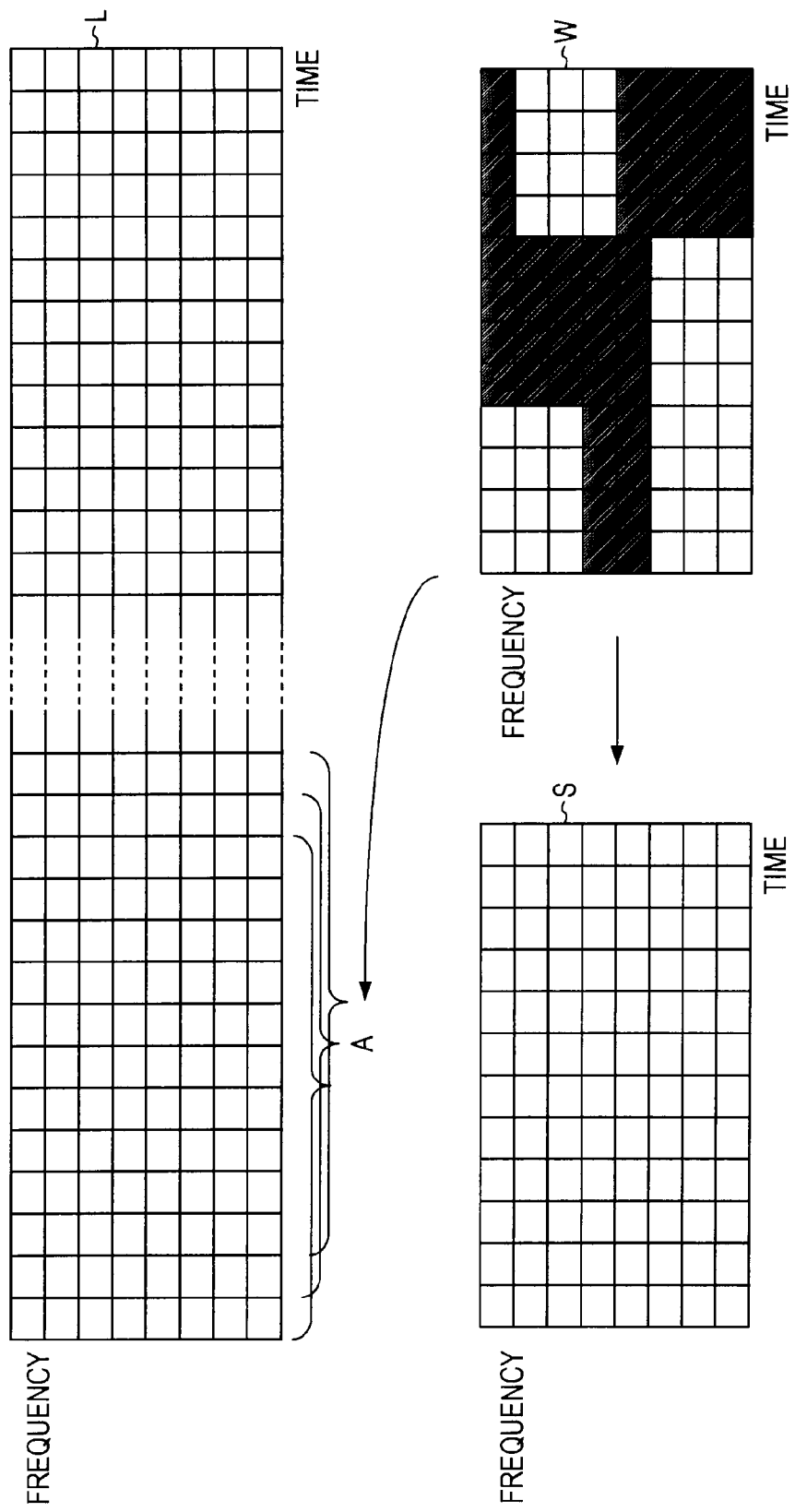
FIG. 15 is a diagram illustrating a matching process of matching the feature quantity of an input signal with the feature quantity of a reference signal.

In FIG. 15, the feature quantity L of the reference signal is shown at the upper end, the feature quantity S of the input signal is shown at the lower-left end, and the mask pattern W is shown at the lower-right end. As described above, they can be treated as matrices.

As shown in FIG. 15, the number of components of the feature quantity L of the reference signal in the time direction is more than the number of components of the feature quantity S of the input signal in the time direction (the number of components of the input signal S in the time direction is equal to the number of components of the mask pattern W in the time direction). Therefore, at the time of calculating the degree of similarity between the feature quantity of the input signal and the feature quantity of the reference signal, the similarity calculating section 71 sequentially cuts out a submatrix A having the same number of components in the time direction as the feature quantity S of the input signal from the feature quantity L of the reference signal while shifting (giving an offset in the time direction) the submatrix in the time direction (to the right side in the drawing) and calculates the degree of similarity between the submatrix A and the feature quantity S of the input signal. Here, when the offset in the time direction at the time of cutting out the submatrix A is t, the degree of similarity R(t) is expressed by Expression 1.

$$R(t) = \frac{\sum_{(f,u) \in M} W_{fu} A_{f(t+u)} S_{fu}}{\sqrt{\sum_{(f,u) \in M} W_{fu} A^2_{f(t+u)} \cdot \sum_{(f,u) \in M} W_{fu} S^2_{fu}}}$$ Expression 1

In Expression 1, f and u represent the frequency components and the time components of the submatrix A of the feature quantity of the reference signal, the feature quantity S of the input signal, and the mask pattern W. That is, A, S, and W to which f and u are added as subscripts represent the elements of the matrices A, S, and W. M represents an element of a non-masked time-frequency region (regions not masked with half-tone dots in the mask pattern shown in FIG. 15) having an element value in the matrix W (mask pattern W). Therefore, in calculating the degree of similarity R(t) shown in Expression 1, since it is not necessary to perform the calculation on all the elements of the respective matrices and the calculation has only to be performed on the elements of the time-frequency regions not masked in the mask pattern W, it is possible to suppress the calculation cost. Since the value of the elements in the time-frequency regions not masked in the mask pattern W represent the weights corresponding to the music level for each time-frequency region of the input signal, it is possible to calculate the degree of similarity R(t) by giving a greater weight to an element in the time-frequency region having a high likeness to music. That is, it is possible to calculate the degree of similarity with higher precision.

In this way, the similarity calculating section 71 calculates the degree of similarity for all the submatrices A (the time offsets t by which all the submatrices A are cut out) and supplies the maximum degree of similarity as a degree of similarity between the feature quantity of the input signal and the feature quantity of the reference signal to the comparison and determination section 72.

The degree of similarity is not limited to the calculation using Expression 1, but may be calculated on the basis of the differences between the elements of two matrices, such as a square error or an absolute error.

Referring to the flowchart shown in FIG. 14 again, in step S112, the similarity calculating section 71 determines whether the similarity calculating process is performed on a predetermined number of reference signals, more specifically, all the reference signals stored in the memory area (not shown) in the matching section 33. When the feature quantities and the music piece attribute information of the reference signals are stored in the database not shown, it is determined whether the similarity calculating process is performed on all the reference signals stored in the database not shown.

When it is determined in step S112 that the similarity calculating process is not performed on all the reference signals, the flow of processes is returned to step S111 and the processes of steps S111 and S112 are repeated until the similarity calculating process is performed on all the reference signals.

When it is determined in step S112 that the similarity calculating process is performed on all the reference signals, the flow of processes goes to step S113 and the comparison and determination section 72 determines whether a degree of similarity greater than a predetermined threshold value is present among the plural degrees of similarity supplied from the similarity calculating section 71. The threshold value may be set to a fixed value or may be set to a value statistically determined on the basis of the degrees of similarity of all the reference signals.

When it is determined in step S113 that a degree of similarity greater than a predetermined threshold value is present, the flow of processes goes to step S114 and the comparison and determination section 72 determines that a piece of music of the reference signal from which the maximum degree of similarity is calculated among the degrees of similarity greater than the predetermined threshold value is a piece of music included in the input signal and outputs the music piece attribute information (such as a music piece name) of the reference signal as the identification result.

Here, the comparison and determination section 72 may determine that pieces of music of the reference signals from which the maximum degree of similarity greater than the predetermined threshold value is calculated are candidates for the piece of music included in the input signal and may output the music piece attribute information of the reference signals as the identification result along with the degrees of similarity of the reference signals. Accordingly, for example, so-called different version pieces of music having the same music piece name but being different in tempo or in the instruments used for the performance can be presented as candidates for the piece of music included in the input signal. A probability distribution of plural degrees of similarity output along with the music piece attribute information of the reference signals may be calculated and the reliabilities of the plural degrees of similarity (that is, the reference signals) may be calculated on the basis of the probability.

On the other hand, when it is determined in step S113 that a degree of similarity greater than the predetermined threshold value is not present, the flow of processes goes to step S115 and information indicating that the piece of music included in the input signal is not present in the reference signals is output.

The flow of processes after step S114 or S115 is returned to step S13 in the flowchart shown in FIG. 5 and the music piece identifying process is ended.

According to the above-mentioned processes, at the time of comparing an input signal in which a piece of music and noise are mixed with a reference signal including only a piece of music, a weight corresponding to a music level is given to the regions having a high music level which is an indicator of a likeness to music in the input signal in the time-frequency domain, a mask pattern masking the regions having a low music level is generated, and the degree of similarity between the feature quantity of the input signal in the time-frequency domain and the feature quantity of the reference signal is calculated using the mask pattern. That is, the time-frequency regions having a low likeness to music are excluded from the calculation target in calculating the degree of similarity, a weight corresponding to the likeness to music is given to the time-frequency regions having a high likeness to music, and the degree of similarity is calculated. Accordingly, it is possible to suppress the calculation cost and to calculate the degree of similarity with higher precision. In addition, it is possible to identify a piece of music from an input signal in which the piece of music and noise are mixed with high precision.

Figure 1:
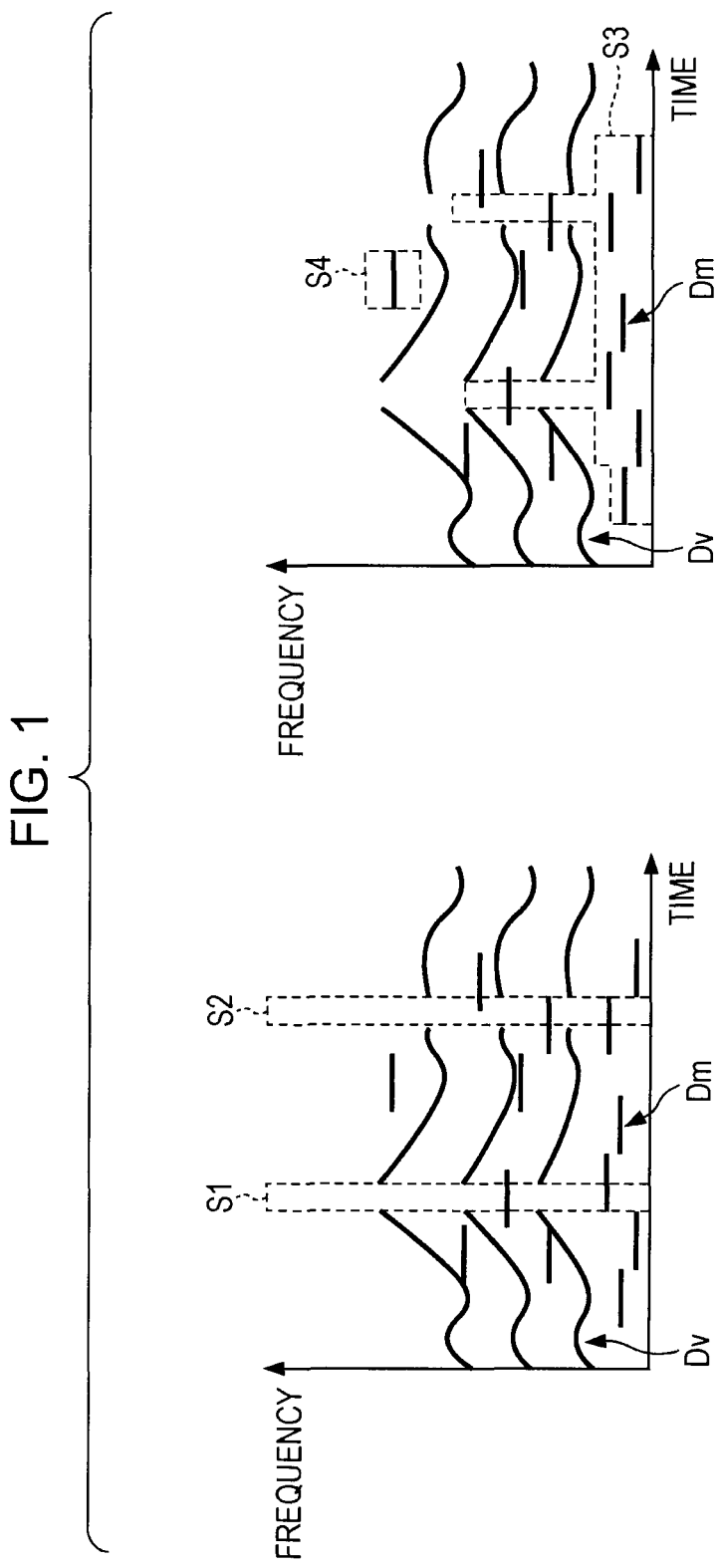
FIG. 1 is a diagram illustrating a feature quantity of an input signal used for a matching process.

Since the matching process can be performed using the feature quantity including the frequency components as well as the time components, it is possible to identify a piece of music from an input signal including a conversation having a very short stop time as noise, as shown in FIG. 1, with high precision. Accordingly, it is possible to identify a BGM overlapping with the actors' conversation in a television program such as a drama with high precision.

The degree of similarity between the feature quantity of the input signal and the feature quantity of the reference signal is calculated using the feature quantity of the cut-out input signal corresponding to a predetermined time. Accordingly, even when a BGM is stopped due to a change in scene in a television program such as a drama, it is possible to satisfactorily identify the BGM using only the input signal corresponding to the BGM until it is stopped.

In the above-mentioned description, the temporal granularity (for example, 0.25 seconds) of the feature quantity of the input signal is set to be different from the temporal granularity (for example, 1 second) of the music level, but they may be set to the same temporal granularity.

In the music piece identifying process described with reference to the flowchart shown in FIG. 5, the reference signal analyzing process is performed between the input signal analyzing process and the matching process, but the reference signal analyzing process has only to be performed before performing the matching process. For example, the reference signal analyzing process may be performed before performing the input signal analyzing process or may be performed in parallel with the input signal analyzing process.

The above-mentioned series of processes may be performed by hardware or by software. When the series of processes is performed by software, a program constituting the software is installed from a program recording medium into a computer mounted on dedicated hardware or a general-purpose personal computer of which various functions can be performed by installing various programs.

Figure 16:
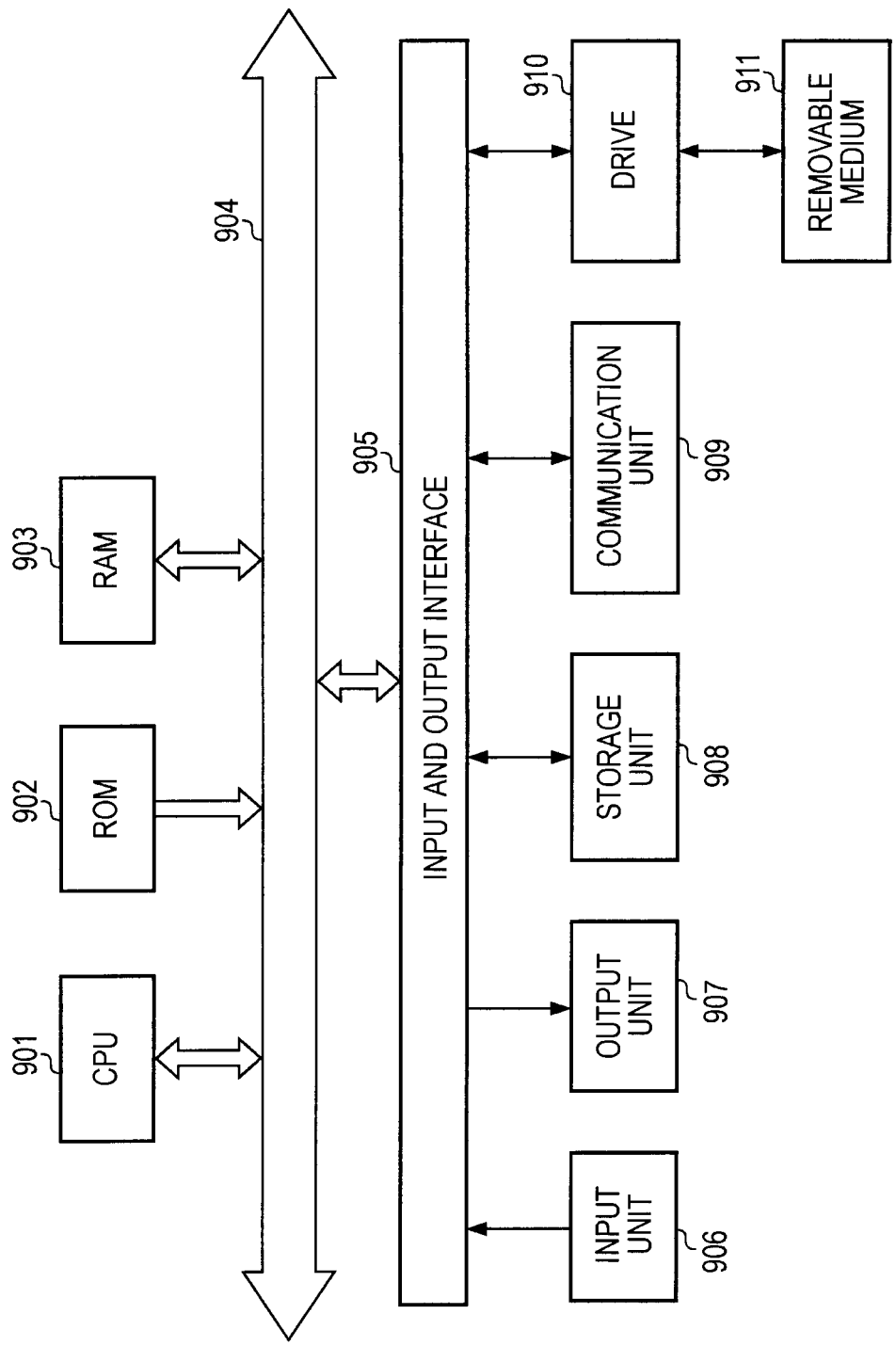
FIG. 16 is a block diagram illustrating the hardware configuration of a computer.

FIG. 16 is a block diagram illustrating an example of a hardware configuration of a computer performing the above-mentioned series of processes in accordance with a program.

In the computer, a CPU (Central Processing Unit) 901, a ROM (Read Only Memory) 902, and a RAM (Random Access Memory) 903 are connected to each other via a bus 904.

An input and output interface 905 is connected to the bus 904. The input and output interface 905 is also connected to an input unit 906 including a keyboard, a mouse, and a microphone, an output unit 907 including a display and a speaker, a storage unit 908 including a hard disk or a nonvolatile memory, a communication unit 909 including a network interface, and a drive 910 driving a removable medium 911 such as a magnetic disk, an optical disc, a magneto-optical disc, or a semiconductor memory.

In the computer having the above-mentioned configuration, the CPU 901 loads and executes a program stored in the storage unit 908 into the RAM 903 via the input and output interface 905 and the bus 904, whereby the above-mentioned series of processes is performed.

The program executed by the computer (the CPU 901) is provided in a state where it is recorded on the removable medium 911 which is a package medium such as a magnetic disk (including a flexible disk), an optical disc (such as a CD-ROM (Compact Disc-Read Only Memory) and a DVD (Digital Versatile Disc)), a magneto-optical disc, or a semiconductor memory, or is provided via wired or wireless transmission media such as a local area network, the Internet, and a digital satellite broadcast.

By mounting the removable medium 911 on the drive 910, the program can be installed in the storage unit 908 via the input and output interface 905. The program may be received by the communication unit 909 via the wired or wireless transmission media and may be installed in the storage unit 908. Otherwise, the program may be installed in the ROM 902 or the storage unit 908 in advance.

The program executed by the computer may be a program in which processes are performed in time series in accordance with the procedure described in the present disclosure or may be a program in which processes are performed in parallel or at a necessary time such as a time when it is called out.

The present disclosure contains subject matter related to that disclosed in Japanese Priority Patent Application JP 2010-243912 filed in the Japan Patent Office on Oct. 29, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing device that identifies a piece of music from an input signal by comparing the input signal with a plurality of reference signals including only the piece of music, the signal processing device comprising:
    a weight distribution generating section that generates a weight distribution corresponding to a likeness to music in regions of the input signal transformed into a time-frequency domain; and
    a similarity calculating section that calculates degrees of similarity between a feature quantity in the regions of the input signal transformed into the time-frequency domain and feature quantities in the regions of the reference signals transformed into the time-frequency domain based on the weight distribution,
    wherein the similarity calculating section calculates the degrees of similarity between the feature quantity in the regions of the input signal being transformed into the time-frequency domain and corresponding to a predetermined time and the feature quantities in the regions of the reference signals being transformed into the time-frequency domain and corresponding to the predetermined time based on the weight distribution.

2. The signal processing device according to claim 1, wherein the weight distribution generating section generates the weight distribution masking the regions in which a music level indicating the likeness to music is not greater than a predetermined threshold value by weighting the regions in which the music level is greater than the predetermined threshold value on the basis of the music level.

3. The signal processing device according to claim 2, further comprising:
    a detection section that detects a point at which a power spectrum of a signal component is the maximum from the input signal; and
    a music level calculating section that calculates the music level on the basis of the occurrence of the maximum point in a predetermined time interval.

4. The signal processing device according to claim 3, wherein the occurrence is an occurrence of the maximum point for each frequency.

5. The signal processing device according to claim 1, wherein the similarity calculating section calculates the degrees of similarity between the feature quantity of the input signal and the feature quantities of the plurality of reference signals, and
    wherein the signal processing device further comprises a determination section that determines that the piece of music of the reference signals, from which the highest degree of similarity is calculated among the degrees of similarity, is the piece of music of the input signal, wherein each of the degrees of similarity is greater than a predetermined threshold value.

6. The signal processing device according to claim 1, wherein the similarity calculating section calculates the degrees of similarity between the feature quantity of the input signal and the feature quantities of the plurality of reference signals, and wherein the signal processing device further comprises a determination section that determines that a plurality of pieces of music of the plurality of reference signals, from which the degrees of similarity higher than a predetermined threshold value are calculated among the degrees of similarity, are the piece of music of the input signal.

7. A signal processing method of identifying a piece of music from an input signal by comparing the input signal with a plurality of reference signals including only the piece of music, the signal processing method comprising:

generating a weight distribution corresponding to a likeness to music in regions of the input signal transformed into a time-frequency domain;

calculating degrees of similarity between a feature quantity in the regions of the input signal transformed into the time-frequency domain and feature quantities in the regions of the reference signals transformed into the time-frequency domain on the basis of the weighting based on the weight distribution;

detecting a point at which a power spectrum of a signal component is maximum from the input signal; and calculating a music level indicating the likeness to music on the basis of an occurrence of a maximum point in a predetermined time interval.

8. A non-transitory computer readable medium having stored thereon, a computer program having at least one code section executable by a computer, thereby causing the computer to perform a signal processing process of identifying a piece of music from an input signal by comparing the input signal with a plurality of reference signals including only the piece of music, the signal processing process comprising:

generating a weight distribution corresponding to a likeness to music in regions of the input signal transformed into a time-frequency domain, wherein the weight distribution is generated by masking the regions in which a music level indicating the likeness to music is not greater than a predetermined threshold value and by weighting the regions in which the music level is greater than the predetermined threshold value on the basis of the music level; and calculating degrees of similarity between a feature quantity in the regions of the input signal transformed into the time-frequency domain and feature quantities in the regions of the reference signals transformed into the time-frequency domain on the basis of the weighting based on the weight distribution.

* * * * *